April 21, 1964 D. W. MUEHLHAUSER 3,129,620
FLOATING TOOL FOR REMOVING BURRS FROM MACHINED SURFACES
Filed Aug. 24, 1960 3 Sheets-Sheet 1

INVENTOR.
Donn W. Muehlhauser,
BY
his ATTORNEY.

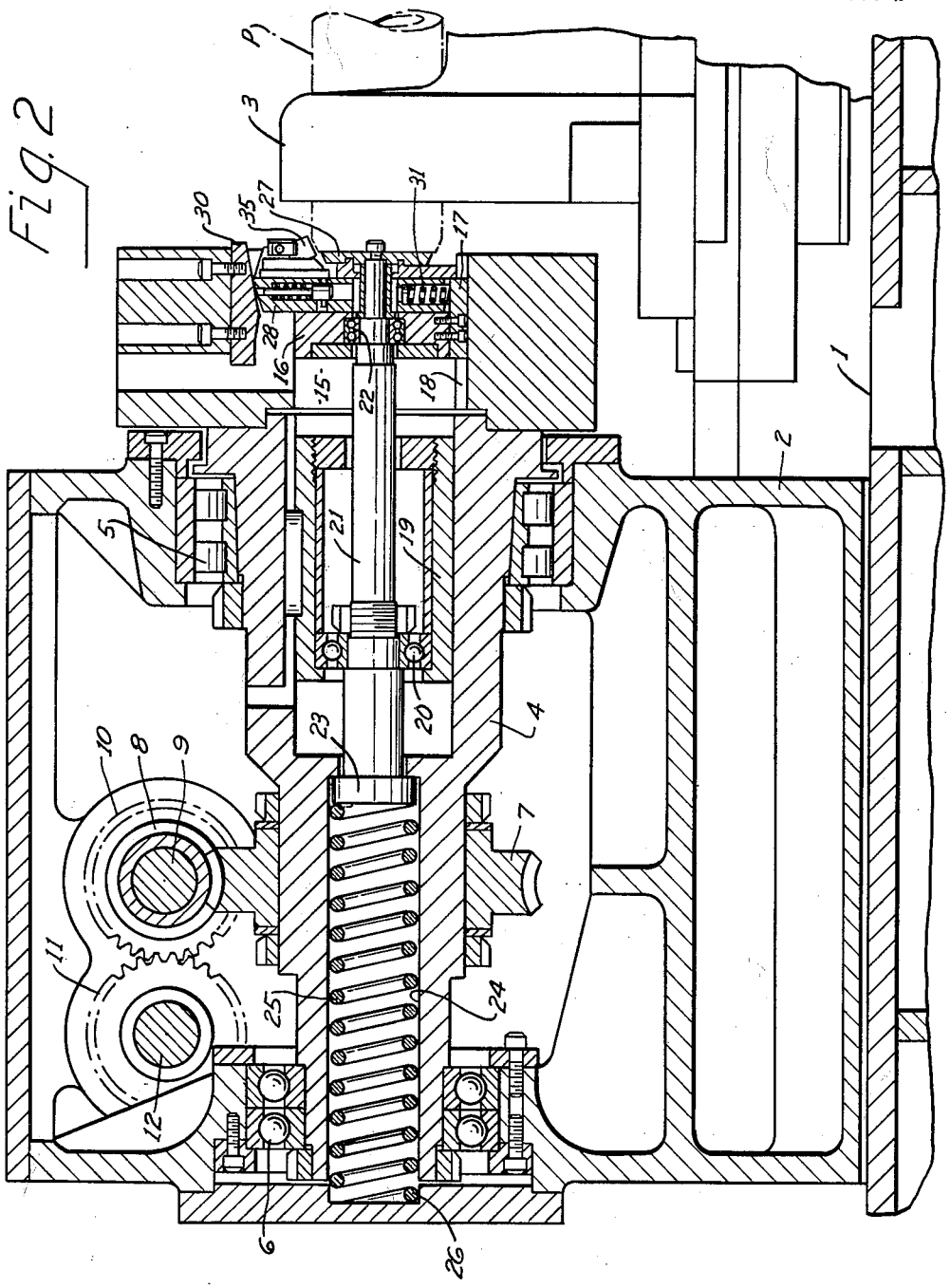

April 21, 1964   D. W. MUEHLHAUSER   3,129,620
FLOATING TOOL FOR REMOVING BURRS FROM MACHINED SURFACES
Filed Aug. 24, 1960   3 Sheets-Sheet 3
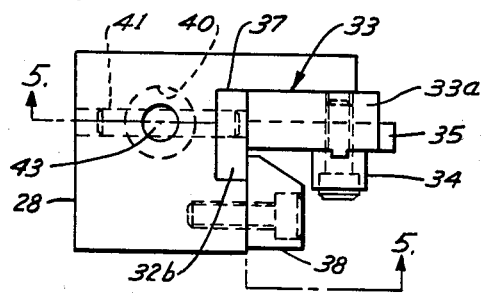
Fig. 4.
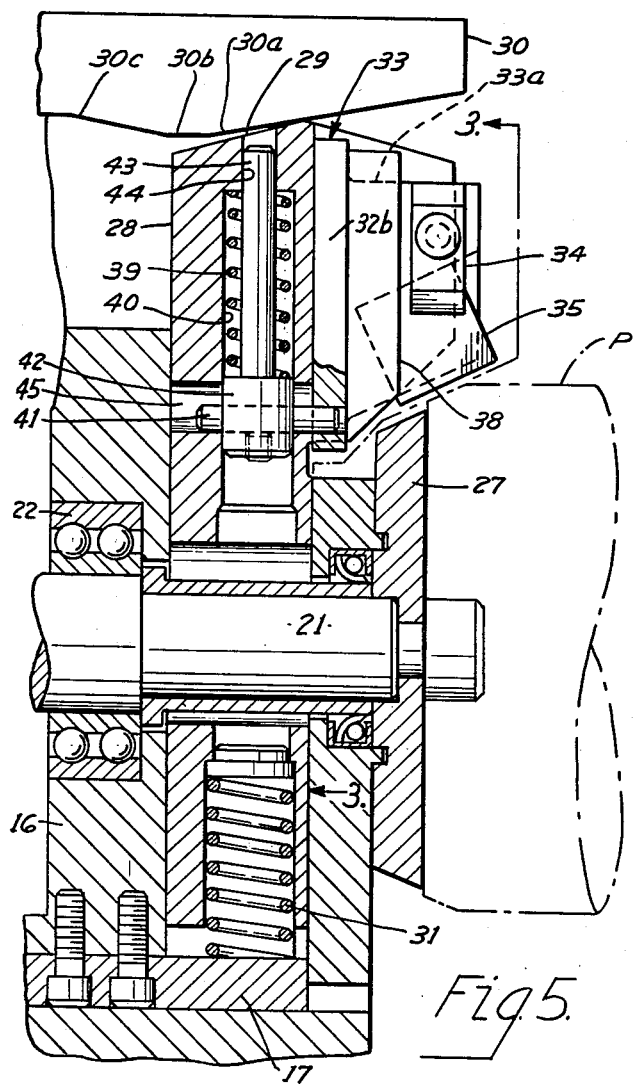
Fig. 3.
Fig. 5.
INVENTOR.
Donn W. Muehlhauser,
BY
John H. Leonard,
his ATTORNEY.

United States Patent Office 3,129,620
Patented Apr. 21, 1964

3,129,620
FLOATING TOOL FOR REMOVING BURRS
FROM MACHINED SURFACES
Donn W. Muehlhauser, Euclid, Ohio, assignor to The
Pipe Machinery Company, Wickliffe, Ohio, a corporation of Ohio
Filed Aug. 24, 1960, Ser. No. 51,579
4 Claims. (Cl. 82—20)

This invention relates to a floating tool for removing burrs from the machined surfaces of members, and particularly for removing burrs formed on the machined surfaces of cylindrical members by threading, chamfering, and like machining operations.

The present invention is an improvement on the chamfer cutting device disclosed in an application Serial No. 756,556, filed August 22, 1958, by William Benninghoff and entitled "Automatic Taper Thread Forming and Chamfer Cutting Machine," and now Patent No. 2,996,736.

For the purposes of illustration, the invention and its advantages are described herein in relation to the deburring of the threads of externally threaded pipes, its use in deburring machined surfaces of rods and other members being apparent from the illustrative example.

The invention of the present invention is such that, if desired, it can be readily incorporated in the improved thread forming machine of the above identified application. It may be installed instead of the chamfering device therein disclosed and can be controlled by the mechanism therein used for controlling of the chamfering device. However, when the present invention is incorporated therein, the pipe must be chamfered prior to threading as the present invention does not perform a chamfering operation.

The invention, however, is herein illustrated incorporated in a separate machine, the manner in which it can be combined with the threading machine being readily apparent.

For the purposes of illustration, it is shown as embodied in a spindle head of the general character described in the above entitled application.

The chamfering device disclosed in the above identified application is one which is rotatable with the spindle head and which has a tool carriage which is moved inwardly toward the axis of the spindle by a suitable cam within the head consequent upon movement of the chamfering device axially relative to the head from a starting position. The axial movement is effected by engagement of a part of the device by the end of the pipe being fed relatively axially of the head. The tool carrier is moved by the cam inwardly by fixed increments progressively as the device is moved axially of the head. The inward movement is predetermined and results regardless of the resistance of the metal. Accordingly, while the device of the application can function suitably for deburring provided the external diameter of the machined surface was precisely related to the cam, it cannot function satisfactory when the surface was not so precisely related to the cam. For example, if the surface is slightly larger in diameter than that to which the carrier and its cutter is advanced by the cam, the cutter is driven into the machined surface. It, therefore, removes not only any burrs but part of the metal forming the machined surface. While this might not of itself be disadvantageous in all cases because a certain truncation is often required on the leading threads, the cutter itself often forms a new burr of its own on the teeth it truncates and this new burr also must be removed to provide a satisfactory thread.

In accordance with the present invention, the cutter is carried on a carriage which is forced inwardly in accordance with a fixed cam or other means which allow no deviation between its movement inwardly relative to its position axially or to the diameter of the work piece. However, the cutter is mounted on the carriage by a support which floats or moves relative to the carriage generally radially toward the axis of rotation of the head. The support is urged inwardly toward the axis by a light spring of which the strength is just slightly more than sufficient to overcome the centrifugal force imposed on the support by its rotation with the head.

The device preferably has a blade which is so arranged, regardless of its shape, that when its carrier is moved inwardly sufficiently, the blade engages and cuts off the entire burr. However, if the carriage is moved farther inwardly beyond this point by the cam so that the blade is pressed against the deburred machined surface, the pressure is relieved by the spring which is insufficiently strong to cause the blade to cut into the machined surface. Continued inward movement of the carriage beyond what is required for deburring merely results in the blade sliding lightly over the machined surface without cutting or marring the surface in any respect.

Various advantages in the specific construction of the apparatus will become apparent from the following description wherein reference is made to the drawings, in which:

FIG. 2 is a vertical sectional view through the spindle axis and is taken on a line 2—2 of FIG. 1, and showing the relation of the spindle to a pipe supporting chuck and spindle support;

FIG. 3 is an enlarged front elevation of the deburring device incorporated in the spindle head illustrated in FIGS. 1 and 2;

FIG. 4 is a top plan view of the device illustrated in FIG. 3;

FIG. 5 is a side elevation, partly in section, as indicated by the line 5—5 in FIG. 4 of the device illustrated in FIGS. 3 and 4, with part of the accessory equipment shown in connection therewith.

Figure 1:
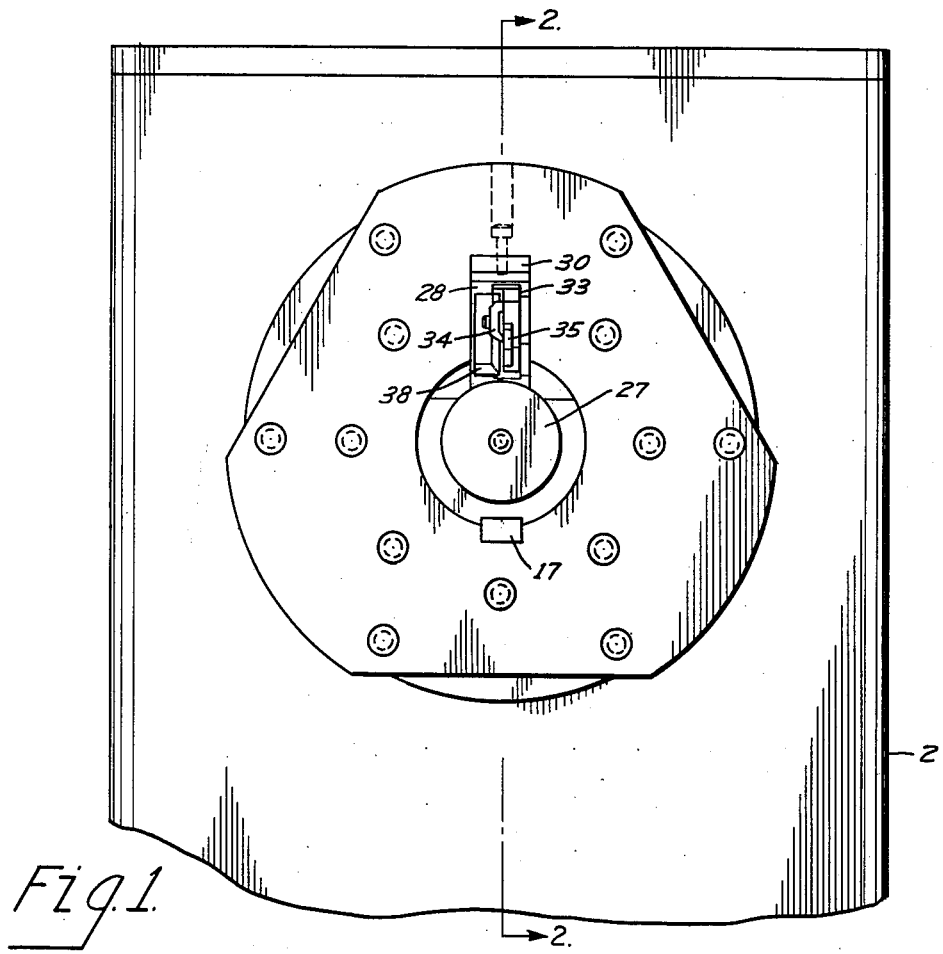
FIG. 1 is a front elevation of the spindle head embodying the present invention.

Referring first to FIGS. 1 and 2, the device is shown incorporated in a spindle head of a type which can readily be incorporated in the spindle of a threading machine of the above identified application. As therein more fully disclosed, the machine comprises a support 1 on which a spindle housing 2 is mounted for movement to different positions endwise of the support, parallel to the spindle axis, for advancing the spindle toward a pipe axially of the pipe. Also mounted on the support 1 is a suitable chuck 3 which is adapted to grip a pipe P and hold it in coaxial relation to the spindle during relative axial movement of the pipe and the spindle. This relative movement may be effected by moving the housing 2 along the support 1 toward the chuck 3, or by moving the chuck 3 along the support toward the housing 2, all in a well known manner.

A spindle 4 is rotatably supported in the housing 2 on suitable sets of antifriction bearings 5 and 6 for rotation about the axis of a pipe held in the chuck 3. For rotating the spindle about its axis, the spindle is provided with a coaxial gear 7 which is driven by a suitable worm 8 on a shaft 9 which carries a spur gear 10. The spur gear 10, in turn, is driven by a complementary gear 11 on a main drive shaft 12. The shaft 12 is driven by any external power means, such as an electric motor. Upon rotation of the shaft 12 by the power means, the spindle 4 is caused to rotate unidirectionally about the axis of a pipe P held in the chuck 3.

The spindle 4 is provided with a central bore or cavity 15 in which the deburring device of the present invention is located. Mounted within the bore 15 for sliding movement axially thereof while remaining in fixed circumferential position relative to the spindle is a cylindrical carrier block 16. The block 16 is coaxial with the bore 15 and fits with slight operating clearance. The block 16 has at one end a key plate 17 which engages in a suitable linear slot 18 in the inner wall of the bore and connects the block 16 for rotation in fixed position with the spindle 4 while permitting the block to move axially of the spindle.

Mounted within the spindle is a splined sleeve 19 in which is mounted a bearing 20 which is coaxial with the axis of rotation of the spindle and is in fixed position axially of the sleeve 19. The sleeve is slidable axially in the bore 15. Mounted in the bearing 20 in fixed axial position relative thereto is a rod 21. One end of the rod is rotatable in suitable antifriction bearings 22 in the block 16. The rod 21 is secured to the block 16 in fixed axial position relative thereto so that the rod 21 and the block 16 can slide as a unit axially of the spindle 4. The sleeve 19 is slidably mounted in the bore 15 for this purpose. At one end, the rod 21 is provided with a suitable radial flange 23 which is accommodated in a bore 24 in the spindle for axial movement. A return spring 25 is interposed between the flange 23 and a cover plate 26 of the spindle for urging the rod 21, and hence the block 16, forwardly of the spindle to starting position, and for resiliently holding them in the starting position endwise of the head.

In order to move the block 16 axially, the rod 21 is provided with a pad 27. The pad 27 is arranged to be engaged by the end of the pipe P held in the chuck and, upon relative movement of the spindle and chuck toward each other, to be pushed by the pipe away from the forward end of the head axially of the head by the pipe P.

The deburring device itself is mounted in the block 16 for movement therewith endwise of the axis of rotation and for movement therewith endwise of the axis of rotation and for movement relative thereto radially of the axis of rotation. The device comprises a carriage 28 which is mounted in the block 16 for sliding movement diametrically of the block in opposite directions. At one of its ends, the carriage 28 has a cam surface 29 which is adapted to ride along a cam 30 mounted in the bore 15 in fixed position circumferentially of the spindle and extending parallel to the axis thereof. The cam 30 has a surface 30a extending from the forward end of the spindle rearwardly and converging toward the axis of rotation rearwardly to a peak at 30b, and a surface 30c beyond the peak which recedes from the axis in a direction away from the forward end of the spindle. Thus, during rotation of the spindle and concurrent movement of the carriage 28 away from the forward end of the spindle the carriage is moved gradually inwardly by fixed increments progressively as it is moved axially of the spindle. When it reaches the peak 30b, it is released to move outwardly again to clear its tool from the surface being cut.

In order to hold the carriage 28 in resilient but firm engagement with the cam 30, the carriage 28 is provided at the opposite side of its axis of rotation from the cam with a suitable bore in which is received a return spring 31, the return spring bearing against the inner end of the bore and the key plate 17 of the block 16.

With the structure thus described, it is apparent that inward movement of the carriage 28 is predetermined by the cam. In the Benninghoff application, the cutter blade is mounted directly on the carriage so that it is moved inwardly fixedly in relation to the cam. Consequently, unless the machined surface is accurately, but precisely, related to the cam, the cutter is apt to be driven into the machined surface and cut away a part of the machined metal, thus changing the contour of the machined surface and possibly itself throwing up a new burr.

In order to eliminate this disadvantage and to assure that the cutter will not cut into the machined metal, the cutter is mounted on the carriage 28 for movement relative thereto toward and away from the axis of rotation. For this purpose, a cutter support 33 is provided.

The cutter support 33 comprises a cutting tool supporting portion 33a provided with a supporting slide portion 33b. The portion 33a carries a bolt secured clamp 34 by which a cutting tool 35 is clamped in fixed adjusted position on the supporting portion 33a. The slide portion 33b is mounted in suitable slideway 37 in the carriage 28 and is held therein for sliding movement by means of a suitable plate 38. Generally, the support 33 is arranged so that it moves approximately radially of the axis of rotation relative to the carriage 28 inwardly and outwardly toward the axis.

For yieldably urging the support 33 inwardly toward the axis relative to the carriage, a relief spring 39 is provided. This spring is arranged to engage suitable shoulders on the carriage 28 and on the support 33, and is normally disposed therebetween under preselected compression.

A convenient arrangement for this purpose comprises a bore 40 in the carriage 28 and which extends radially of the axis of rotation and in which the spring 39 is disposed. In order to provide a suitable shoulder on the support 33 for reaction with the spring 39, the support 33 is provided with a pin 41 on which is mounted a head 42 which supports a suitable rod 43. The rod 43 extends axially through the spring 39 into a suitable counterbore 44 in the carriage 28. A transverse passage 45 is provided in the carriage 28 for permitting a limited movement of the pin 41 so that the support 33 can move properly within predetermined limits radially of the axis of rotation.

The spring is preselected so that it urges the support 33 and hence the cutting tool 35 inwardly toward the axis with sufficient force to overcome centrifugal forces resulting from the rotation of the support and cutter and to apply the cutting tool to the machined surface of the pipe under a light pressure which is sufficient to cut off the burrs, but which is insufficient to cause the tool 35 to cut into the machined surface after it engages that surface due to the removal of the burrs. The selected strength of the spring depends upon weight of the support and parts attached thereto which are movable relative to the carriage 28. Thus, even though the carriage 28 is forced inwardly by the cam with a force which could force a tool such as the tool 35 into the machined surface and cause additional cutting and burring, the spring 39 relieves this pressure so that the tool 35 engages properly to remove burrs and then rides lightly without cutting on the machined surface.

Preferably, the tool is made with an elongated cutting edge so that it can span several threads on the pipe and thus engage a substantial amount of surface provided by a plurality of threads. This distributes the spring pressure effectively and limits the spring pressure per unit of machined surface to a very small amount.

In the form illustrated, the device is mounted in a spindle head which rotates, hence the spring must be sufficient to operate against the centrifugal forces resulting from the rotation. However, the device may readily be incorporated in a machine in which the head does not rotate, but, instead, the pipe is rotated by a rotatable chuck. When the relative rotation between the article to be deburred and the device is due to rotation of the article by the chuck, a lighter spring is used. Since it does not have to overcome any centrifugal forces, the effective force of the lighter spring is equal to the effective force of a heavier spring operating against centrifugal forces.

Figure 6:
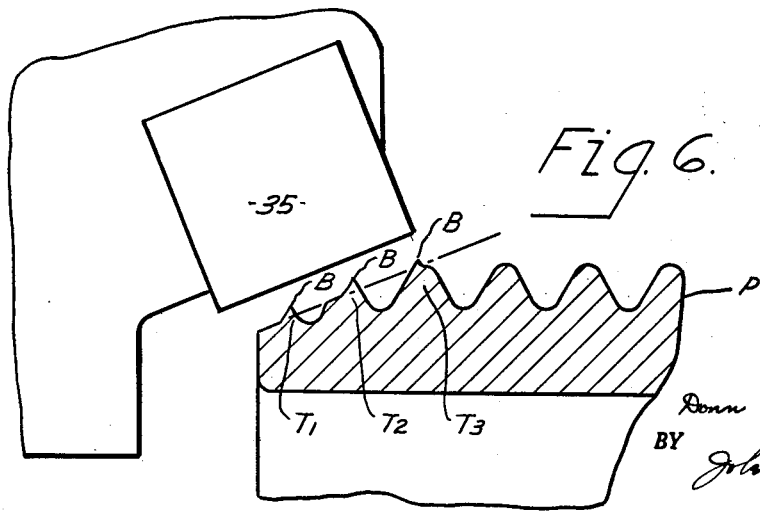
FIG. 6 is a diagrammatic illustration showing the burr to be removed and the manner of operation of the tool.

Referring next to FIG. 6, the pipe P is shown as one having a tapered thread with the teeth indicated at $T_1$, $T_2$, and $T_3$, teeth $T_1$ and $T_2$ being truncated due to the original chamfer of the pipe prior to threading. During the threading operation in a machine such as described in the above Benninghoff application, burrs, such as indicated at B, are formed frequently on some of the threads by the multi-tooth thread chaser. As illustrated, the burrs are shown on the truncated leading threads $T_1$ and $T_2$. The tool 35 preferably is elongated sufficiently and straight edged so that it can extend along the upper surfaces or crests of the truncated threads when the tool is moved inwardly by the cam for the deburring operation. Due to the limited strength of the spring and the tool engagement with a substantial amount of top surface of the threads $T_1$ and $T_2$, the tool removes the burr B and then rests lightly on the already machined surfaces of the threads $T_1$ and $T_2$ and does not cut into the machined surface. The spring applied force may be so limited that the tool does not have any appreciable polishing effect on the already machined surface.

The tool is preferably supported on the support 33 so that during the cutting operation it has little or no front clearance. As a result, it can readily remove the burr and then ride on the original machined surface.

If desired, the device can be embodied in the spindle head of the above identified Benninghoff application so that it performs the deburring operation concurrently with threading. In such case, of course, the end of the pipe is chamfered preparatory to inserting it in the machine for threading.

Having thus described my invention, I claim:

1. An apparatus for removing a circumferentially extending burr from a machined cylindrical surface of a workpiece and comprising a tool carriage, a chuck for supporting a workpiece having a circumferentially extending burr and to be deburred, means supporting the carriage and chuck for relative rotation about a predetermined axis and lateral movement of the carriage toward and away from said axis, means to effect said relative rotation, means to effect said relative lateral movement during said relative rotation, a tool support, a cutting tool thereon, means connecting the support to the carriage for movement relative to the carriage along a predetermined path toward and away from said axis, respectively, said tool having a cutting edge adapted to be applied by the support so as to engage and remove a circumferentially extending burr from the machined surface as the tool is advanced by the carriage and to engage the deburred machined surface with little or no front clearance after the tool has removed the burr, and said cutting edge being elongated endwise of the machined surface so as to engage the machined surface after deburring for substantial distance lengthwise of the surface, resilient means carried by the carriage and yieldably urging the support relative to the carriage toward the axis with an effective force great enough to cause the tool to cut off the burr from the machined surface of the member, and insufficient to cause the tool to cut into the machined surface upon engagement of the tool with the machined surface.

2. An apparatus for removing a circumferentially extending burr from a machined cylindrical surface of a work piece and comprising a tool carriage, means supporting the carriage for concurrent rotation about a predetermined axis adapted to be made coincident with the axis of the surface and movement toward and away from said axis, means to rotate the carriage, means to move the carriage toward said axis during rotation, a tool support, a cutting tool thereon, means connecting the support to the carriage for movement relative to the carriage along a predetermined path toward and away from said axis, respectively, said tool having a cutting edge adapted to engage and remove burrs from the machined surface as the tool is advanced by the carriage and to engage the deburred machined surface with little or no front clearance after the tool has removed the burrs, said cutting edge being elongated endwise of the machined surface so as to engage the machined surface after deburring for a substantial distance lengthwise of the surface, resilient means carried by the carriage and yieldably operatively interconnecting the support and carriage and urging the support along said path relative to the carriage toward the axis in opposition to centrifugal force of the support with a force great enough so that the resultant force is sufficient to cause the tool to cut off the circumferential burr of a cylindrical machined surface and insufficient to cause the tool to mar or cut into the surface against the resistance of machined surface upon engagement of the tool with the machined surface.

3. An apparatus according to claim 2 wherein the means supporting the carriage include a spindle, and the means to move the carriage relatively to the axis includes the following: means supporting the carriage in the spindle for movement in opposite directions, endwise of the axis of rotation, from a starting position, means rotatable with the spindle and connected to the carriage and operative to move the carriage toward the axis progressively during progressive movement of the carriage endwise of the axis in one direction from said starting position, means for effecting progressive movement of the carriage in said one direction, and means to return the carriage to starting position.

4. An apparatus according to claim 3 wherein the means to move the carriage in said one direction is a rigid abutment connected to the carriage for movement endwise of the axis in fixed endwise position relative to the carriage, and said abutment is positioned to be engaged and moved in said direction by the end of a workpiece fed in said direction in coaxial relation to the spindle.

References Cited in the file of this patent

UNITED STATES PATENTS

| | | |
|---|---|---|
| 745,101 | Gates | Nov. 24, 1903 |
| 1,298,570 | Salley | Mar. 25, 1919 |
| 2,054,028 | Benninghoff | Sept. 8, 1936 |
| 2,456,532 | Lewis | Dec. 14, 1948 |
| 2,996,736 | Benninghoff | Aug. 22, 1961 |